United States Patent [19]
Steinmetz

[11] 3,911,629
[45] Oct. 14, 1975

[54] METHOD FOR SHARPENING DRILLS AND OTHER CUTTING TOOLS

[76] Inventor: John C. Steinmetz, P.O. Box 672, Coer D'Alene, Idaho 83814

[22] Filed: Apr. 8, 1974

[21] Appl. No.: 459,117

Related U.S. Application Data

[63] Continuation-in-part of Ser. No. 259,589, June 5, 1972, Pat. No. 3,838,540.

[52] U.S. Cl. .................................. 51/288; 51/124 R
[51] Int. Cl.² ........................................... B24B 1/00
[58] Field of Search ........ 51/288, 94 C, 95 R, 97 R, 51/124 R, 219 R, 219 PC, 225

[56] References Cited
UNITED STATES PATENTS

| | | | |
|---|---|---|---|
| 490,588 | 1/1893 | Palmer et al. | 51/219 R |
| 819,173 | 5/1906 | Schmaltz | 51/219 R X |
| 2,866,302 | 12/1958 | Amiet | 51/124 R X |
| 3,158,969 | 12/1964 | Cawi | 51/219 R |
| 3,579,924 | 5/1971 | Saito | 51/288 |

Primary Examiner—Al Lawrence Smith
Assistant Examiner—Nicholas P. Godici
Attorney, Agent, or Firm—Robert M. Ashen

[57] ABSTRACT

A method for accurately and quickly sharpening multiple cutting edges of a rotary cutting tool such as a drill in a single continuous operation. The method comprises providing a grinding surface, holding the drill relative to the grinding surface, and imparting a composite movement to the drill. This composite movement comprises simultaneously i. rotating the drill in one direction about a rotation axis which extends in generally the same direction as the drill axis, but which intersects the drill axis at the cutting end of the drill and is otherwise out of alignment with the drill axis during at least a portion of the rotation, and ii. tilting or pivoting the drill back and forth above a pivot axis wich intersects and extends generally perpendicular to the drill axis at the cutting end of the drill, in timed relation to the rotation.

This composite movement provides the relieved portions back of the cutting edges of the drill. The moving drill is periodically moved away from the grinding surface to avoid grinding off the point or apex of the drill. The drill is selectively advanced into the grinding surface to achieve the desired amount of sharpening.

12 Claims, 8 Drawing Figures

METHOD FOR SHARPENING DRILLS AND OTHER CUTTING TOOLS

This application is a continuation-in-part of copending U.S. Pat. Application Ser. No. 259,589, filed June 5, 1972, now U.S. Pat. No 3,838,540, in the name of the same inventor.

The present invention relates to a simple, semi-automatic, method for accurately sharpening drill bits, end mills, and countersink tools, etc. The effectiveness of machines and methods now available for the purpose is diminished by their complexity, cost and the training demanded of the operator. The less complex methods are either too slow or are too inaccurate to be considered as precision grinding. A drill bit will not produce its dimensional hole size unless it is ground exactly centered, with both lips of the drill having an identifical angle and clearance. These demanding requirements are controlled by the present method and do not rely upon the operator's skill or knowledge.

One of the principal objects of this invention is to grind both lips of a drill while it is being continuously rotated one revolution about an axis which intersects the drill axis at the drill cutting end. During this revolution the lip clearance is ground by swinging the drill about a hinge or pivot axis which extends transversely to said rotational axis. This pivot axis may be located at the vertex of the drill point. Thus, the rotary movement of the drill is not about its own axis, as is the case in many prior art methods.

GENERAL DESCRIPTION

Apparatus for practicing the method of the invention is illustrated in FIGS. 1 through 8. The apparatus comprises generally a base assembly 105 on which is mounted a grinding head assembly 103 that includes a grinding wheel 101. The grinding wheel 101 rotates about its own axis, but it remains in a fixed location during the entire grinding operation. The desired spacial relationship between the drill or other tool to be sharpened and the grinding wheel is achieved by movement of the drill. The grinding head assembly 103 can be readily moved out of the way, so that the drill can be mounted in place.

The drill or other tool to be sharpened is releasibly mounted in a chuck pivot assembly 106. The chuck pivot assembly 106 is supported on a chucking head assembly 104 for slow rotation of the chuck pivot assembly 106 about the axis Y—Y of assembly 104. Advancing means 181 are operable to incrementally advance the entire chucking head assembly 104 toward the grinding wheel 101 so as to achieve alternate grinding of the cutting edges of the drill until the desired amount of drill sharpening is completed. To provide for clearance behind each of the cutting edges of the drill, the chuck pivot assembly 106 is mounted for pivotal or tilting movement in timed relation to the aforesaid rotation. This pivotal movement is about an axis Z—Z which extends approximately through the point where axis Y—Y intersects with the grinding wheel. This point is also at the apex of the drill being sharpened. Cam-operated tilting means 107 are provided for controlling the tilting or pivoting of the chuck pivot assembly 106.

Each time the drill rotates past a drill cutting edge and its relief portion, the drill is retracted from the cutting wheel so that the apex of the drill is not ground off; in this connection, additional cam-operated retracting means 108 are provided for retracting the entire chucking head assembly away from the grinding wheel at the proper times during the rotation. This permits the continuous operation of grinding two or more separate cutting edges without stopping and adjusting or repositioning the drill or parts of the apparatus. This of course permits faster and more accurate grinding of the drill.

BASE ASSEMBLY

Figure 2:
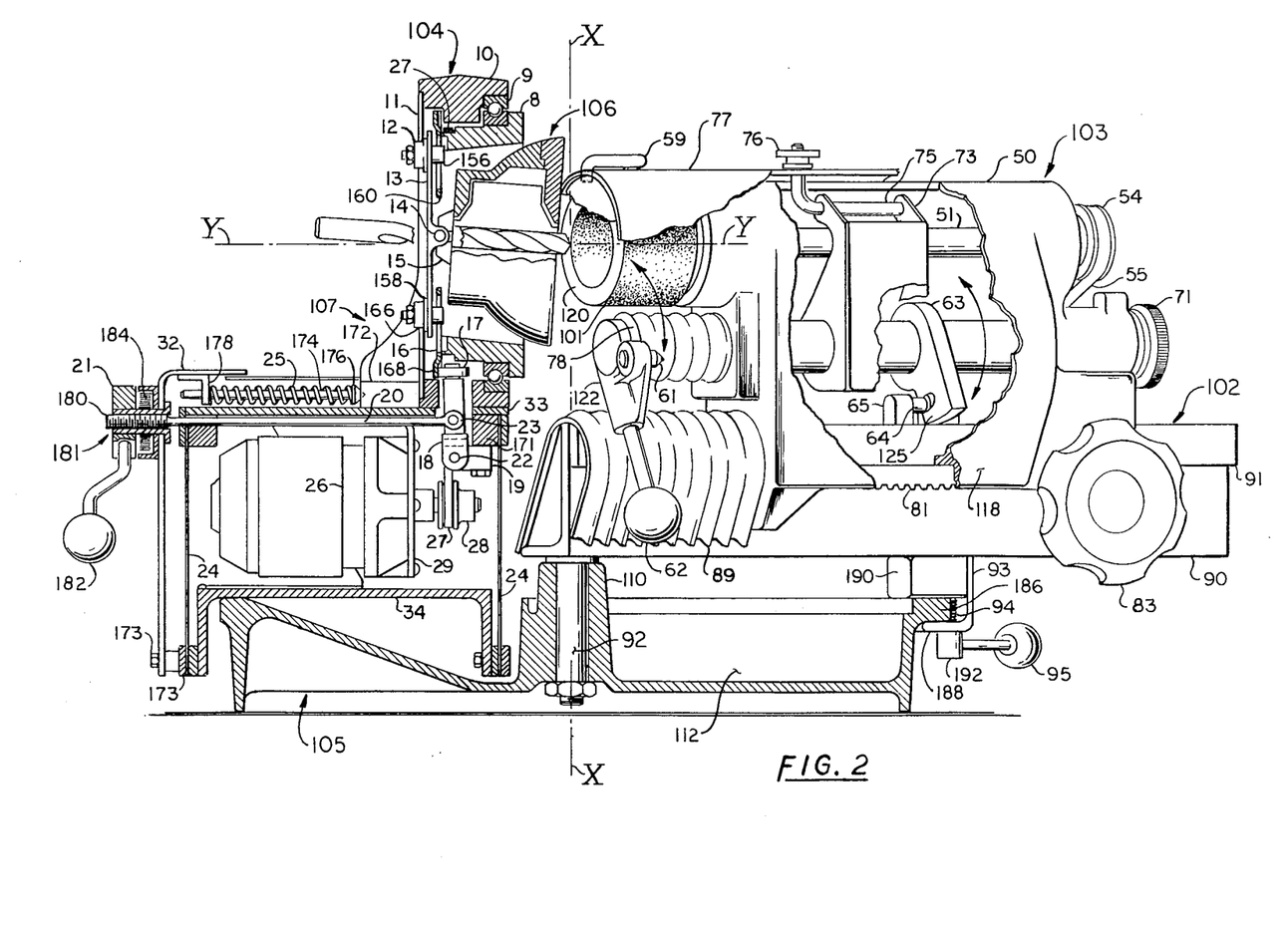
FIG. 2 is a side sectional view taken generally along line 2—2 of FIG. 1.

The base assembly 105 comprises a generally circular base having a central hub portion 110. Portion 110 has a central bore in which is rotatably received a way pivot shaft 92. The way assembly 102 is mounted on this shaft 92, as will be explained, for rotation about a vertical main axis X—X that passes through the grinding surface and the vertex of the drill point being sharpened. This is best seen in FIG. 2. The half of the circular base rearwardly of the center hub 110 is recessed to provide a coolant tank 112.

WAY ASSEMBLY

Figure 1:
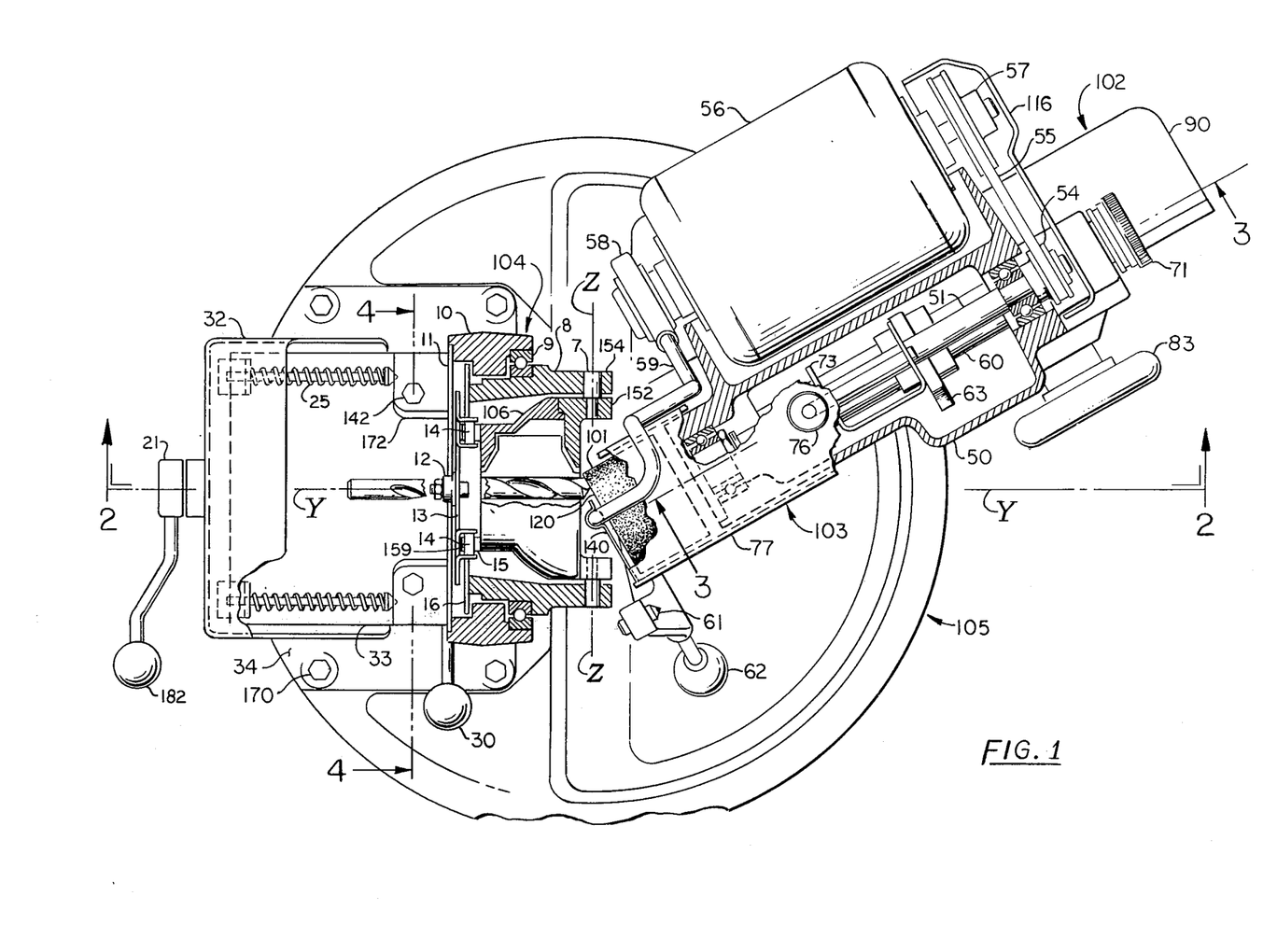
FIG. 1 is a plan view of a sharpening apparatus for practicing the method of the present invention.
Figure 3:
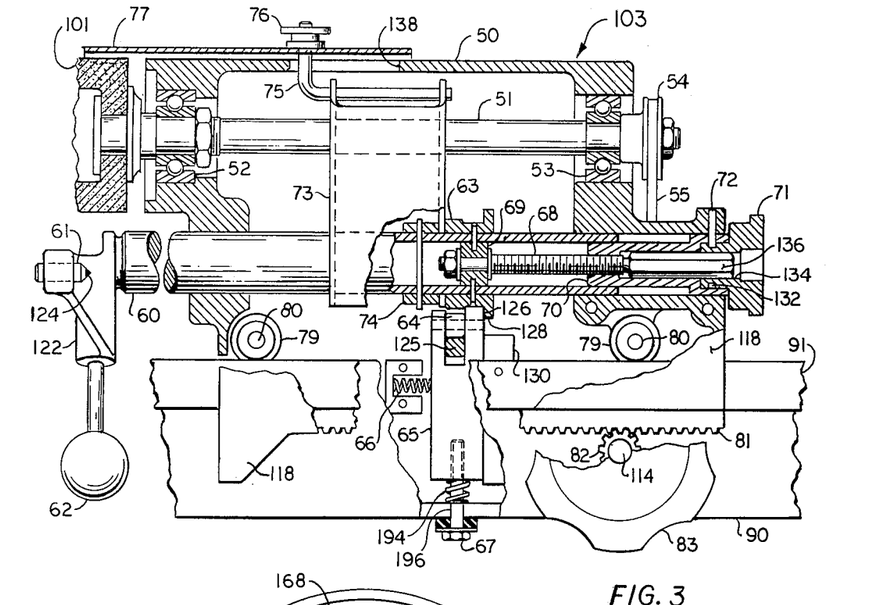
FIG. 3 is a side sectional view taken generally along line 3—3 of FIG. 1, showing the grinding head assembly.

The way assembly 102 comprises an elongated way frame 90 which is mounted at one end on the way pivot shaft 92 and extends outwardly therefrom at a selected angle as illustrated best in FIG. 1. The way frame 90 is generally L-shaped in vertical section, having a horizontally disposed portion and a vertically disposed portion. A way track 91 is secured on top of the vertically disposed portion of the way frame 90, and receives for movement along the track 91 the grinding head assembly 103. A traverse knob 83 is fixed to the outer end of a horizontally extending shaft 114 rotatably supported in the vertically disposed portion of the way frame 90. Also secured on the shaft 114 is a small pinion 82 (FIG. 3). The pinion engages a rack 81 of the grinding head assembly 103 as will be described below. The traverse knob 83 is mounted toward the rear or free end of the way frame 90. The front or innermost portion of the way track 91 is covered by a way boot 89 (FIG. 2) which serves to protect the track from dust and bits of material as well as from the coolant used for the grinding operation.

GRINDING HEAD ASSEMBLY

The grinding head assembly 103 comprises a grinding head housing 50 in which a horizontally extending arbor 51 is rotatably mounted on bearings 52 and 53. A grinding wheel 101 is fixedly mounted on the forward end of the arbor 51, while a pulley 54 fixedly mounted at the rear end of the arbor, is connected through a belt 55 to a pulley 57 of a motor 56. The motor 56 is also mounted in the grinding head housing 50. A cover or shield 116 may be provided over the pulleys 54 and 57, and the belt 55 as shown in FIG. 1. The grinding housing 50 is movably supported on the way track 91 by a pair of spaced apart track rollers 79 (FIG. 3) mounted by means of roller pins 80 on the grinding head housing 50. A downwardly depending portion 118 of the grinding head housing 50 carries the elongated rack 81 which engages the pinion 82 operated by the traverse knob 83. Thus, by rotating the knob 83, the grinding head housing 50 and the parts which it in turn carries may be caused to move back and forth along the way track 91.

The grinding wheel 101 is generally in the shape of a hollow cylinder disposed with its axis horizontal, at the approximate height of the drill axis, and at an angle to that drill axis sufficient to form the desired apex or included angle for the drill. This last angular relationship is shown best in FIG. 1 and FIG. 7. The grinding surface 120 of the grinding wheel is a planar forward edge which is in the configuration of a circular ring. Thus, the grinding for this illustrated apparatus is achieved by a flat or planar surface which lies in a fixed vertical plane as shown best in FIG. 1. This plane will be referred to as the base or reference plane X, since it passes through the main vertical axis X—X and it remains constant while the drill is moved relative to that plane to achieve the desired grinding.

The dressing of the grinding face 120 of the grinding wheel is achieved by in effect moving the grinding wheel incrementally into a diamond dresser 61. In effect, the dresser 61 is permanently positioned with its dressing tip 124 in the reference plane, and is moved in that plane, into the path of the grinding wheel as the grinding wheel is incrementally advanced forward and into that plane, to achieve the dressing. Thus, the resulting dressed planar grinding surface 120 will automatically be in the reference plane at the end of the dressing operation. There is no need for further adjustment or positioning of the grinding wheel after the dressing operation, as in the case in many of the prior art devices. This result is achieved in general by in effect moving the grinding wheel into and relative to the reference or grinding plane while maintaining the dressing tip in that plane. More particularly, a horizontally extending tubular dresser bar 60 is rotatably mounted in the grinding head housing 50, as shown best in FIG. 3. The dresser bar 60 is rotatable abouts its axis and is also longitudinally movable relative to the housing 50. At its forward end, the bar 60 carries a bracket 122 on which the diamond dresser 61 is secured, with the tip 124 of the dresser 61 lying in the reference plane. The diamond dress 61 is normally positioned away from the grinding wheel 101 by virtue of the clockwise rotation of the bar 60 in accordance with the arrow shown in FIG. 2. This rotation may be achieved by manually moving the dresser handle 62 mounted on the bracket 122. The bar 60 and the dresser 61 are normally fixed against movement longitudinally of the bar by means of a lock pawl 63. As shown best in FIG. 2, the pawl 63 has a finger 125 which engages a striker roller 64 mounted between upwardly extending arms of a striker assembly 65 (FIG. 3). The lock pawl 63 serves to lock not only the bar 60 against longitudinal movement, but by virtue of the connection between the bar 60 and the grinding head housing 50, also serves to lock the housing 50 and the grinding wheel 101 is position against longitudinal movement. When it is desired to move the grinding head assembly 103 away from the chuck head assembly 104 to permit insertion and positioning of the drill, the handle 62 may be rotated counter clockwise, as shown in FIG. 2, to release the pawl 63, and the grinding head assembly 103 may then be retracted by rotation of the traverse knob 83. Then the drill is locked in position, the grinding head assembly 103 may be returned to its operative position by turning the knob 83 to move the grinding head assembly in the forward direction. This forward movement is then stopped by the engagement of a rearwardly facing surface 126 of the striker assembly 65 with a forwardly facing surface of an annular flange portion 128 of the lock pawl 63, as shown best in FIG. 3. To absorb the impact when the grinding head assembly 103 is moved back to its operative position and flange 128 engages surface 126, the striker assembly 65 is biased in the rearward direction by a strong bumper spring 66 (FIG. 3), which urges the striker assembly 65 rearwardly against a stop block 130 fixedly mounted on the way assembly. To provide the proper spatial relationship and locking action between the finger 125 of the lock pawl 63 and the striker roller 64, the illustrated striker assembly 65 is provided with a striker adjustment means 67 which permits slight vertical adjustment of the position of the striker assembly 65. This adjustment is normally achieved during manufacture of the apparatus. The illustrated striker adjustment means 67 comprises a heavy duty spring 194 on which the assembly 65 is supported, and a screw 196 which extends through a bottom wall of the way frame 90, through the spring 194, and is threaded into the lower end of the striker assembly 65. The spring 194 is under tension and the screw 196 can be turned to lower or permit the assembly 65 to be urged to a higher position.

To effect dressing of the grinding surface, with the pawl 63 unlocked and the grinding head assembly fully retracted to the rear, the dresser adjustment knob 71 is manually rotated to effect incremental rearward movement of the dresser bar 60 and the dresser 61 (and the pawl 63) relative to the grinding head housing 50 and the grinding wheel 101. More particularly, the dresser adjustment knob 71 is rotatably mounted on a rearward extension of the housing 50. The knob 71 is retained in place by a sleeve retainer pin 72 which is received in an annular groove 132 around the circumference of the inner forward end of the knob 71. This retains the knob 71 in place while permitting its rotation. The knob 71 has a broached center opening 134 which is hex shaped in section and in which a bar portion 136 of mating hexagonal cross-section is received. Thus, the bar portion 136 is locked to the knob 71 for common rotation, while permitting longitudinal movement of the bar portion. Secured to the forward end of the bar portion 136 is a dresser adjustment screw 68. The forward end of the dresser adjustment screw 68 is mounted in a screw thrust bearing 69 which permits rotation of the screw 68 while locking it in position longitudinally relative to the bar 60 and the lock pawl 63. A sleeve nut 70 is fixedly secured to the rear portion of the housing 50, where it receives the forward end of the dresser adjustment knob 71 for rotation therein. The sleeve retainer pin 72 passes through the sleeve nut 70 to lock the nut 70 longitudinally and also rotationally to the housing. The forward portion of the sleeve nut 70 has a reduced outer diameter, with its forward end being received in the rear end of the dresser bar 60. The forward end of the sleeve nut 70 is internally threaded and in threaded engagement with the dresser adjustment screw 68. Now the operation of this part of the mechanism can be understood. Rotation of the dresser adjustment knob 71 transmits rotation to the hex bar portion 136 and to the dresser adjustment screw 68. As the screw 68 is rotated, it moves longitudinally to the right as viewed in FIG. 3. The screw 68 carries with it to the right the lock pawl 63, the dresser rod 60 and the dresser 61. Thus, rotation of the dresser adjustment knob 71 effects longitudinal movement of the dresser 61 relative to the grinding wheel 101 and its housing 50. Since the pawl 63 is a fixed distance from the point 124 of the dresser 61, when the grinding head assembly 103 is returned to its forward position by knob 83 and the pawl 63 is relatched, the grinding wheel 101 and the housing 50 will in effect have shifted to the left or forwardly. The shift is equal to the amount dressed off of the grinding face of the grinding wheel. The newly dressed face now lies in the same reference plane X as did the prior grinding surface.

A wheel guard 77 which partially surrounds the grinding wheel 101 and serves to confine the coolant to the grinding area, is also mounted on the housing 50 in such a manner that it is shifted longitudinally forward relative to the housing 50 and the grinding wheel 101 incident to the dressing operation so that the wheel guard 77 is in the proper position relative to the newly dressed grinding surface after the dressing operation has been completed. This is achieved automatically and without additional adjustment of the wheel guard 77. In this connection, the wheel guard 77 is mounted on a wheel guard carrier 73 which in turn is mounted on the dresser bar 60. The carrier 73 has a generally U-shaped configuration. It is disposed with its central portion extending generally vertically and parallel to the axis of the arbor 51 and the dresser bar 60, and with its legs extending transversely to said axis. The dresser bar 60 extends through openings in the lower portions of the legs of the carrier 73 and as shown in FIG. 3 longitudinal movement of the carrier relative to the bar is prevented by a thrust collar 74 affixed to the bar on the side of the rearmost leg of the carrier opposite from the lock pawl 63. The upper portions of the side legs of the carrier 73 have smaller apertures that receive the lower horizontally-extending leg of an L-shaped guard retaining bolt 75. The other leg of the guard retaining bolt 75 extends upwardly through an opening 138 in the housing 50 and through the wheel guard itself. A guard retaining nut 76 connects to the upper end of the guard retaining bolt 75 to secure the bolt to the wheel guard 77. The opening 138 through which the upper portion of the bolt 75 passes accommodates rearward movement of the wheel guard 77, the bolt 75, and the carrier 73 relative to the housing 50 incident to dressing of the wheel. Thus, the wheel guard 77, as well as the dresser 61, are maintained in a fixed relationship to the reference plane, regardless of the amount of longitudinal movement of the dressing wheel incident to its being dressed. The nut 76 may be removed to permit removal of the wheel guard 77 when required as for repair or inspection or to replace the grinding wheel 101.

As shown in FIG. 2, a dresser boot 78 is provided around the forward end of the dresser bar 60, serving the same functions as the way boot 89 described above. These boots 78 and 79 have an accordion configuration so that they can readily contract and again expand as the bar and dresser 61 are moved relative to the housing 50 and as the housing is moved on the way track 91.

FIG. 1 shows the construction of the front end of the wheel guard 77 in that an inwardly turned lip 140 extends partially across the front edge of the wheel guard 77. Suitable gaps or openings are formed in the lip 140 to permit access for the tool and for the dresser to the grinding surface. As shown generally in FIG. 1, a collant pump 58 mounted on the front end of the motor 56 and driven by that motor causes discharge of a continuous flow of coolant through discharge tube 59 into the interior of the wheel guard in the space between the grinding surface 120 and the lip 140. The coolant flows in this space and floods the area of the grinding surface where it is engaging the tool being sharpened. The coolant then flows downwardly into the coolant tank 112 from where it is recirculated through suitable tubing (not shown) to the pump 58. Conventional filtering means, also not shown, may be utilized so that the coolant introduced to the grinding wheel is free of impurities. The gap or spacing between the grinding surface 120 and the lip 140 is important and the apparatus is constructed, as described in detail above, to automatically maintain this spacing when the grinding wheel is dressed.

CHUCK HEAD ASSEMBLY

The chuck head assembly 104 comprises a pivot hinge ring 8 which has a generally annular configuration and is rotatably mounted by means of a hinge ring bearing 9 on an annular hinge ring support 10. The hinge ring support 10 is secured as by means of bolts 142 to horizontally extending support plate 33 (see FIGS. 1 and 4). The support plate 33 is mounted through a pair of oscillator plates 24 (whose operation will be described below) on a support channel 34 (FIGS. 1 and 2) which in turn is mounted on the front portion of the base 105. The pivot hinge ring 8 has an annular groove adjacent its forward edge on which is disposed a belt 27 that drivingly connects the hinge ring 8 with a pulley 28 driven by a gear head motor 26. The motor 26 is pivotally supported from the support plate 33. In particular, a motor hinge plate or bracket 31 is bolted to the underside of the plate 33 and extends downwardly therefrom and a motor support 29 is pivotally supported on the bracket 31. The motor 26 is supported on the outer end portion of the motor support 29, as shown best in FIG. 4. Thus, the weight of the motor 26 applies tension to the belt 27 to provide adequate frictional contact to ensure proper transmission of rotation from the motor pulley 28 to the pivot hinge ring 8. An outwardly extending lever handle 30 is provided for pivoting the motor 26 upwardly to relieve the tension on the belt 27 and permit free manual rotation of the hinge ring 8. The weight of the motor 26 normally prevents such rotation of ring 8. The user would so operate the lever 30 when he desired to rotatably position the ring 8 and the chuck pivot assembly 106 which is carried by and rotates with that ring. The chuck pivot assembly 106 is mounted on the pivot hinge ring 8 so that it can tilt or pivot as will be explained below. The hinge ring 8 and chuck pivot assembly will normally be revolved at about 5 to 7 rpm incident to grinding a drill or the like.

CHUCK PIVOT ASSEMBLY

The chuck pivot assembly 106, which holds the drill, is pivotally mounted by means of pivot pins 7 within the pivot hinge ring 8, as best shown in FIG. 1. This axis of tilting or pivoting of the chuck pivot assembly 106 is designated Z—Z. The axis Z—Z is perpendicular to the rotational axis Y—Y, passes through the vertex of the projected point of the sharpened drill, and also passes through the main vertical axis X—X. The drill axis intersects the axis of rotation Y—Y of the chuck pivot assembly 106 at the point where the axis Y—Y and the axis Z—Z intersect one another. As will become clearer as the description proceeds, the drill axis and the rotational axis Y—Y are aligned when the chuck pivot assembly 106 is in a centered or non-tilted position; but they are not aligned (except for the intersection at the drill point) when the assembly 106 is tilted about axis Z—Z incident to its rotation about axis Y—Y. Means (not shown) may be provided on the chuck pivot assembly 106 to orient the drill rotationally and axially.

As shown in the drawings, the chuck pivot assembly 106 has a pair of upstanding ears 152, which receive the inner ends of the pivot pins 7. The outer ends of the pivot pins 7 are received in a pair of outwardly extending ears 154 of the pivot hinge ring 8. As noted above, the axis defined by the pins 7 is designated Z—Z.

TILTING MEANS

Figure 4:
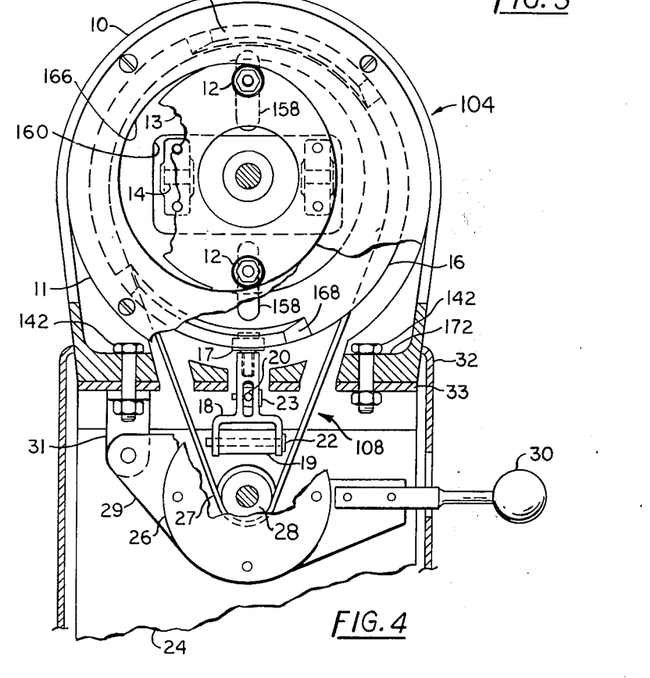
FIG. 4 is a sectional view taken generally along line 4—4 of FIG. 1.

The tilting means 107 for effecting tilting movement of the chuck pivoted assembly 106 will now be described in detail. Referring particularly to FIGS. 2 and 4, it will be seen that an oscillator cam 16 in the form of a vertical plate in the generally configuration of an annular ring is secured to the rear surface of the rotatable pivot hing ring 8. Connected to the oscillator cam 16 for rotation therewith is a cam follower plate 13. The cam follower plate 13 is a generally circular plate disposed generally vertically, immediately forwardly of the oscillator cam 16, and shiftable transversely or in its own plane to some extent relative to the cam 16. The cam follower plate 13 is also connected to the rotating chuck pivot assembly 106 in a manner transmitting rotation but permitting certain relative movement therebetween. Mounted on the cam follower plate, 180° apart from one another, are a pair of cam follower bearings 12. The bearings 12 are 90° out of phase with the pivot axis Z—Z. The cam follower bearings 12 extend forwardly from the cam follower plate. The bearings 12 also each include a rearward projection 156 that is received for sliding movement in an elongated slot 158 in the oscillator cam 16 (FIG. 4) so as to transmit rotation from the cam 16 to cam follower plate 13. The slots 158 extend along a line intersecting and normal to the axis Y—Y. The slots 158 also extend perpendicular to the pivot axis Z—Z of the chuck pivot assembly 106. As will be understood from the further description, the slots 158 also facilitate the tilting or pivoting of the chuck pivot assembly 106 pursuant to the shifting of the cam follower bearings 12 and the cam follower plate 13 back and forth in the direction of said slots 158. This shifting movement of the bearings 12 and the plate 13 is transmitted to the chuck pivot assembly 106 through a pair of plate hinge pins 14 which are received respectively in axially extending slots 159 defined by a pair of pivot lugs 15 formed on and extending forwardly from the forward face of the chuck pivot assembly 106. The slots 159 are deeper than the diameter of the plate hinge pins 14 so that the slots can accommodate movement of the plate hinge pins therein in the axially direction. Thus, the plate hinge pins 14 in the slots 159 translate the vertical shifting movement of the cam follower plate 13 into pivoting or tilting movement of the chuck pivot assembly 106, while the pins 14 slide up and back to some extend in the slots 159 incident to this movement. A rectangular shape opening 160 is provided in the center of the oscillator cam 16 to accommodate or receive this means which interconnects the cam follower plate 13 and the chuck pivot assembly 106.

It will be noted also that pivot lugs 15 are spaced apart at opposite edges of the chuck pivot assembly 106. Similarly the cam follower bearings 12 are positioned outwardly from the axis Y—Y as also shown in FIG. 4. This arrangement of parts permits the rear end of the drill to extend outwardly as illustrated in FIGS. 1 and 2, rear of the chuck pivot assembly and the chuck head assembly. In this connection, the chuck pivot assembly 106 may have a central opening through which the rear end of the drill extends.

Shifting of the cam follower plate 13 and the cam follower bearings 12 is achieved by the engagement of the bearings 12 with an inwardly directed annular cam edge 166 of the lip clearing cam 11 mounted on the front face of the hinge ring support 10. The shape or configuration of the edge 166 is shown best in FIG. 4. It will be recalled that the hinge ring support 10 remains stationary and will hold the lip clearing cam 11 stationary while the cam follower plate 13 and the cam follower bearings 12 slowly rotate. This produces the shifting of the cam follower plate 13 to produce tilting of the chuck pivot assembly. This tilting in combination with the rotation, provides the clearance portion for each drill cutting edge. The movement to generate the clearance portion for one cutting edge is achieved by the engagement of one of the cam follower bearings 12 with the cam edge 166, while the movement to generate the clearance portion for the second cutting edge is achieved by the engagement of the other cam follower bearing 12 with that cam edge 166.

RETRACTING MEANS

The illustrated apparatus also includes retracting means 108 which serve to retract the drill point out of the way of the grinding wheel after the first cutting edge has been ground and preparatory to grinding the second cutting edge.

The means for retracting the drill is shown best in FIGS. 1, 2 and 4. In general, the entire chucking head assembly 104 is shiftably mounted on the two oscillator plates 24 for front-to-back movement relative to the base 105 and to the grinding head assembly 103. The shiftable chucking head assembly 104 is biased by a pair of oscillator springs 25 toward the grinding position shown in FIGS. 1 and 2. Cam surfaces on the slowly rotating oscillator cam 16 engage a oscillator cam follower 17 so as to intermittently, and in timed relation to the rotation of the drill about its axis, shift the chucking head assembly 104 away from the grinding wheel (to the left as viewed in FIGS. 1 and 2). This retracts the drill point from the grinding surface for a sufficient time and rotation of the drill, so that the drill reaches a rotational position where it can be brought back to the grinding surface for the grinding of the second cutting edge. The drill continues to rotate as it is fed into the grinding wheel and the two cutting edges and their relief portions are alternately ground. In other words, the cycle of tilting, retract, tilting, retract, etc. continues until the drill is sharpened as desired.

Now to consider the structure of this retract means in further detail. As described briefly above, the hinge ring support 10 is securely mounted on support plate 33, which in turn is shiftably mounted by means of the oscillator plates 24 to the support channel 34. As shown in FIG. 1, the support channel 34 is bolted as by means of bolts 170 to the base 105. The oscillator plates 24 are each large rectangular plates made of spring steel or a comparable material. The plates 24 are very thin, having a thickness of approximately 0.020 inches. The plates 24 are secured along their upper edges and along their lower edges, as shown best in FIG. 2, by being tightly clamped along those end edges between pairs of clamping bars 171 that are secured to the support plate 33 and the support channel 34, respectively, as by means of bolts 173. The oscillator plates 24 mounted in this manner, create a highly effective mechanism or arrangement for causing this support plate 33 and those parts which it carries to repeatedly shift back and forth in the direction of the axis Y—Y. The support plate 33 is maintained parallel to the ground through the oscillating movement, and while there is some shift in height of the plate 33 due to the fact that the upper ends of the plates 24 are moving through arcs, this does not adversely effect the operation of the apparatus since the drill is out of contract with the grinding surface during the retraction phase of the operation, or in any event, any such movement merely shifts the vertical position of the drill in the grinding plane X and does not adversely affect the grinding operation.

Figures 5, 6, 7, 8:
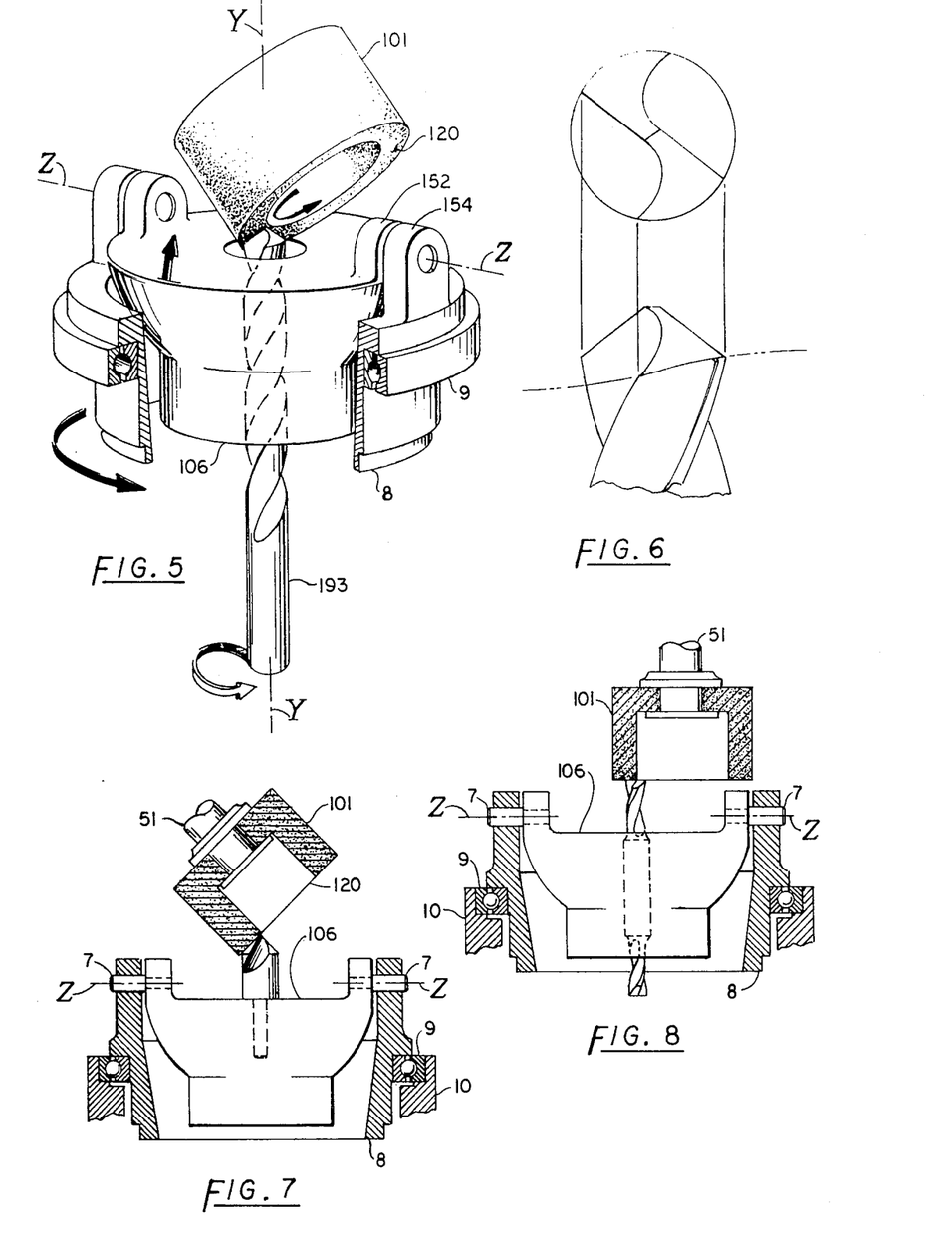
FIG. 5 is a diagrammatic view of the drill holding means and the grinding wheel.
FIG. 6 is a schematic showing of the end and the side of a sharpened drill.
FIG. 7 is a diagrammatic view of the apparatus used for a countersink tool.
FIG. 8 is a diagrammatic view of the apparatus used for an end mill.

An oscillator housing 32 is supported on the forward end of the support channel 34, as best shown in FIG. 2. The mounting of the oscillator springs 25 is shown best in FIGS. 1 and 2. Each of the oscillator springs 25 is mounted on a horizontally extending rod 174 which has a head 176 that abuts and is supported in a notch in a forwardly extending ear 172 of the hinge ring support 10. The other end of the rod 174 is slidably received in a hole in the downwardly extending leg of a bracket 178 secured to the underside of the upper wall of the oscillator housing 32 as shown best in FIG. 2. The oscillator spring 25 thus reacts against the bracket 178 secured to the oscillator housing 32 and exerts a rearward force on the rod head 176 which is transmitted through the ears 172 to the entire chucking head assembly 104. As noted above, this tends to urge that assembly 104 to the right as viewed in FIGS. 1 and 2. This movement is limited by the engagement of the oscillator cam 16 with the oscillator cam follower 17. As shown in FIGS. 2 and 4, cam portions 168 of the oscillator cam 16 are dented or deformed forwardly. These cam portions 168 extend around the periphery of the cam 16 as shown in FIG. 4. When a cam portion 168 is rotated into position to engage the oscillator cam follower 17, as shown in FIGS. 2 and 4, this permits movement of the chucking head assembly 104 to the right to put the drill point into grinding wheel engaging position. When the oscillator cam 16 rotates to a position intermediate the cam portions 168, the chucking head assembly 104 is thereby shifted or moved to the left to the retracted or non-grinding position. In this connection, while a cutting edge and its associated clearance portion is being ground, one of the depressed portions 168 is engaging the oscillator cam follower 17. The portions 168 have relatively steep ends so that as soon as the grind of the clearance portion of a cutting edge has been accomplished, the cutting tool is pulled away from the grinding surface to protect the apex or point of the cutting tool. If this were not done, the continued rotation of the drill in its forward grinding position relative to the grinding surface would result in that point being undesirably ground down, so that the desired cutting tool configuration as shown in FIG. 6, would not be achieved. Controlling the timing of the withdrawal of the cutting tool from the grinding surface at the appropriate time is an important requirement for this type of apparatus, utilizing the movement described above.

The oscillator cam follower 17 is mounted on the upper end of a generally vertically extending follower lever 18 which is pivotally mounted intermediate as its ends on a rod hinge pin 23 that extends generally horizontally from side to side of the apparatus, as shown in FIG. 4. The rod hinge pin 23 connects the follower lever 18 to one end of an elongated infeed adjustment rod 20 which engages at its other end with an infeed adjustment nut 21 rotatably mounted on the front wall of the oscillator housing 32. The lower end of follower lever 18 is yoked-shape, as shown in FIG. 4, and receives therein a lever hinge 19 which is pivotally connected to the follower lever 18 by means of transversely-extending lever hinge pin 22. Lever hinge 19 is mounted to the underside of one of the bars 171 holding the rear oscillator plate 24 to the support plate 33. Thus, the lever hinge 19 is mounted on the support plate 33 for movement therewith. It can now be seen, that the rod hinge pin 23, which is connected through the infeed adjustment rod 20 to the oscillator housing 32, is in a stationary position while the lower end of the follower lever 18 is pivotally connected through the lever hinge 19 to the shiftable portions of the apparatus. Thus, as the contour of the oscillator cam 16 changes in a front-to-rear direction, the oscillator cam follower 17 maintains contact with the adjoining surface of the oscillator cam 16 as the shiftable portion of the apparatus moves forward or backward. In this connection, it can be seen that there is some rotation of the follower lever 18 about the rod hinge pin 23, as well as forward or rearward shifting of the chucking head assembly 104 (including the oscillator cam 16 and the lever hinge 19), all of which are connected together for common movement.

It will be noted that mechanical advantage is provided in that the distance from the oscillator cam follower 17 to the rod hinge pin 23 is greater than the distance from the hinge pin 23 to the lever hinge pin 22.

INFEED MECHANISM

The means or mechanism 181 for feeding the cutting tool into the grind wheel will now be described in detail. The end of the infeed adjustment rod 20 which is engaged with the infeed adjustment nut 21 is an enlarged externally-threaded section 180. Section 180 is in threaded engagement with the internal bore of the infeed adjustment nut 21 so that rotation of the nut 21 causes longitudinal movement of the rod 20. The threads of the section 180 and the nut 21 are high-lead so that relatively small amount of rotation of nut 21 will provide relatively large longitudinal movement of the rod 20. The nut 21 is provided with a handle 182 and it is mounted on the oscillator cover 32 for rotation in a fixed position. A torsion spring 184 is connected between the nut 21 and the housing 32 to bias the nut 21 to the rotational position where the rod 20 is towards the left as viewed in FIG. 2. To effect grinding of the drill, the handle 182 is rotated so as to advance the rod 20 to the right. This in turn moves the oscillator cam follower 17 to the right, and the oscillator cam 16 is thereby permitted to move to the right under the urging of the springs 25. The chuck housing assembly 104 is thus moved to the right so as to gradually advance the drill into the grinding surface. The rotation of the nut 21 may be calibrated so that the operator knows the amount of grinding of the drill which he is achieving by a given amount of rotation of the nut. After the desired amount of grinding has been achieved, the operator releases the handle 182 and the torsion spring 184 will return the rod 20 and the cam follower 17 to the left to permit the oscillator springs 25 to return the chuck head assembly 104 to its leftward withdrawn position.

GRINDING HEAD ASSEMBLY ADJUSTMENT

FIG. 1 illustrates best the angle of incline of the grinding head assembly 103 relative to the chuck head assembly 104. As can be seen from the illustrated engagement of the grinding surface 120 of the grinding wheel with the drill being sharpened, this angular disposition of the grinding head assembly determines the included angle of the drill. The illustrated apparatus permits simple and easy changing of this angle of inclusion by merely changing the angular disposition of the grinding head assembly about the main vertical axis X—X. Referring to FIG. 2, the grinding head assembly 103 is rotatably mounted about axis X—X on the way pivot shaft 92, which is rotatably received in the hub portion 110 of the base 105. As shown in FIG. 2, the way frame 90 on which the grinding head assembly 103 is mounted carries means which releasibly clamp to an annular flange 186 around the rear edge of the base 105. More particularly, a way angle clamp 93 defines a slot in which the flange 186 is received. The way angle clamp 93 is mounted on the underside of the way frame 90. A clamp screw 94 extends rotatably through the lower arm 188 of the way angle clamp 93 and is threaded into the upper portion or arm 190 of the clamp 93. This clamp screw 94 has an enlarged head 192 which abuts the lower surface of the lower arm 188 of the clamp 93. The head 192 has fixed to it a screw handle 95. To adjust the angular position of the grinding head assembly 103, the clamp screw 94 is loosened by rotating the screw handle 95, and the assembly 103 is manually rotated to the desired rotational or angular position. Suitable calibrations may be provided on the base flange 186. When the desired position is achieved, the handle 95 is used to tighten the clamp screw 94 to lock the assembly 103 in this position. Thus, one simple adjustment is all that is required to change the angle of inclusion for the drill or tool being ground. There is no need to adjust or change any of the other dimensions or arrangements of the apparatus since the angular adjustment has been made about the vertical main axis X—X to which the other dimensions and relationships on the apparatus relate.

CUTTING TOOLS WHICH MAY BE SHARPENED

FIG. 6 illustrates the desired configuration for a sharpened drill 193. The drill is concentric around its longitudinal axis, the cutting edges are equal, joining at the center apex of the drill, and being at equal angles to the drill axis.

FIG. 7 illustrates diagrammatically the use of the apparatus for sharpening or grinding a countersink cutting tool. This tool has a single cutting edge followed by a relieved portion which is generally conical but which is out-of-conical just enough to provide the cutting edge. Between the cutting edge and the trailing end of the relief portion is a gap or recess for the chips and cut material. When sharpening such a countersink tool, the cam 11 is removed and replaced with another cam which will produce the generally conical configuration. As compared to cam 11, the cam edge of the countersink cam will define what comes very close to a circle centered at the axis Y—Y although there is enough deviation to provide the relief from the cutting edge. Changing the cam 11 is a simple matter, requiring only the removal of several screws and the substitution of a new cam. It will also be noted in FIG. 7 that the apex of the countersink tool is positioned outwardly of or beyond the tilting axis Z—Z. This does not pose a problem for the particular tool being ground.

FIG. 8 shows the utilization of the present apparatus to grind a two-fluted end mill. For this application the grinding wheel axis is rotated to position generally parallel with the axis Y—Y. Because of this arrangement, the grinding wheel is positioned so as to clear the ear portions 152 and 154, and the end mill is supported in the chuck with its cutting end disposed a short distance beyond or outwardly of the pivot axis Z—Z. The same lip clearing cam 11 may be utilized for grinding this end mill as is used to grind the drill such as 193 (FIG. 6).

THE SHARPENING OPERATION

Now the operation of the illustrated apparatus will be described. Initially, the operator will determine that the correct lip clearing cam 11 is installed on the apparatus. He will also determine that the desired inclusion angle is defined by the angular position of the grinding head assembly 103 and that that assembly is locked in that position by the screw handle 95. The grinding head assembly 103 is then backed away from the chucking head assembly 104 to make room to mount the drill. First, the dresser handle 62 is pivoted upwardly about 15° to release the lock pawl 63 and then the traverse knob 83 is turned to roll the grinding head assembly 103 rearwardly on the way track 91.

The drill or other tool to be sharpened may then be inserted into the chuck pivot assembly 106 and held in a centered position. As noted above, means are provided which position the drill axially and rotationally with respect to the chuck pivot assembly 106 as well as with respect to the pivot ring 8, the oscillator cam 16, the cam follower plate 13, and the cam follower bearings 12. This is necessary to relate the cam operated tilting of the drill about the second grinding motion axis Z—Z and its periodic retraction to its rotational position. In other words, the basic rotational relationship must be fixed so that the drill will be moved precisely to generate the cutting edges and relieved portions and so as to avoid grinding off the drill apex. This tilting and retracting movement of the drill is complementary to the slow rotational movement about the first grinding motion axis Y—Y also imparted to the drill and will be designated secondary movements for purposes of this description. It should be emphasized again, that the drill does not rotate about its own axis but rather is rotated as a whole about axis Y—Y. Since the rotational movement serves in the illustrated apparatus to effect the secondary movements, they are therefore in the proper timed relationship to one another. The speed of rotation about axis Y—Y is therefore in fixed time relation to the cycle of the secondary movements; the faster the rotation, the faster the cycle and the slower the rotation, the slower the cycle. The cycle will continue to repeat itself so long as the drill is rotated by the motor 26. Therefore, the rotational position of the ring 8 and the parts rotationally fixed to it for common rotation (including the drill) is not critical although a starting rotational position can be established by the operator if desired. He simply lifts up on the lever 30 which takes the weight of motor 26 off of the belt 27 and can then manually rotate the chuck pivot assembly to the position desired. The grinding head assembly 103 may then be rolled forwardly along the way track 91 until the flange 128 of the lock pawl 63 abuts the stop surface 126 of the striker assembly 65 (FIG. 3). This movement is achieved by turning the traverse knob 83. At the end of this forward travel of the grinding head assembly 103, the dresser handle 62 is rotated downwardly to engage the finger 125 of the lock pawl 63 with the striker roller 64 to thereby lock the grinding head assembly in position. The grinding surface 120 of the grinding wheel 101 is thereby positioned passing through the vertical central axis X—X of the apparatus. The surface 120 in this position also defines the reference plane X.

At this time, the drill is slightly backed away from the grinding surface 120. This back-off is sufficient to provide clearance regardless of the rotational position of the chuck pivot assembly 106 and the oscillator cam 16. In other words, even if a depressed cam portion 168 of the oscillator cam 16 is engaging the oscillator cam follower 17 as shown in FIG. 2 so that the drill is advanced toward the grinding wheel relative to its retracted position where an intermediate non-depressed portion of the oscillator cam 16 is engaging the oscillator cam follower 17, there still is clearance between the drill and the grinding surface 120. This is to protect the drill from impact by the grinding wheel.

To achieve the grinding of the drill, power is turned on to cause the grinding wheel to rotate and cause the ring 8 to rotate. The handle 182 is then manually rotated to shift the oscillator cam follower 17 to the right and permit the drill to advance to the grinding surface 120 under the urging of the springs 25. The advancing may be incremental and of a desired amount so that a determined amount is ground off during each rotation of the drill. Thus, the two cutting edges of the drill may each be ground down the desired incremental amount during one rotation of the drill and then ground down in added increments for each subsequent rotation of the drill. This continues until the drill has been ground to produce a good cutting configuration as shown in FIG. 6. If desired, this advancing operation could be automated so that manual advancing would not be required. The illustrated arrangement is simpler and less costly, and readily accommodates differences in the amount of material being ground from successive tools being sharpened.

It will be noted that nothing need be done to adjust or set the apparatus for going from one cutting edge to the other and back again in a continuously repeating cycle. The apparatus automatically rotates the drill slowly about axis Y—Y, and in timed relationship to that rotation, tilts the chuck pivot assembly 106 for each grind of the clearance for each cutting edge. As described above, this tilting around the Z—Z axis is effected by the annular cam edge 166 controlling the transverse shifting of cam follower bearings 12 and cam follower plate 13, as they are rotated by the oscillator cam 16. This transverse shifting movement is translated through plate hinge pins 14 on the cam follower plate 13 to the pivot lugs 15 mounted on the chuck pivot assembly 106 so that the drill is tilted or pivoted as it rotates to achieve the clearance portion following each cutting edge. As soon as the clearance portion is ground, and also incident and in timed relation to the rotation of the drill, an edge portion of the oscillator cam 16 intermediate the cam portions 168 reaches the oscillator cam follower 17 to quickly and precisely withdraw the drill from the grinding surface. This protects the integrity of the drill apex as the gap for chips and cut material is passed and a subsequent cutting edge is encountered. At this point the oscillator cam 16 again automatically shifts the drill back to the engagement position by virtue of a cam depressed section 168 reaching the oscillator cam follower 17. The tilting to achieve the clearance for the next cutting edge is then achieved under the control of the lip clearing cam 11. This process continues, with each cutting edge and its clearance being progressively further ground during each revolution of the drill as it is advanced into the grinding surface by operation of the handle 182. By the foregoing continuous alternate and automatic grinding of the cutting edge of the drill without repositioning the drill, the angle of each cutting edge is accurate and equal to the other as are the clearance portions. Thus, a truly concentric and balanced reground and sharpened drill is provided.

When the sharpening has been completed, the handle 182 is released and the torsion springs 184 will rotate the rod 20 to permit the oscillator springs 25 to withdraw the drill from the grinding wheel. Then the handle 62 may be pivoted upwardly to release the lock pawl 63 and the knob 83 may be used to back-off the grinding wheel. The chuck may then be stopped and opened to release the sharpened drill.

DRESSING OF THE GRINDING WHEEL SURFACE

To dress the grinding wheel surface 120 the handle 62 is raised so as to release the lock pawl 63 and the knob 83 is turned to fully retract the grinding head assembly 103 along the way track 91. The calibrated knob 71 is then rotated for the desired amount of dress which, as described in detail above, moves the dresser 61 and the dresser bar 60 relative to the grinding head housing 50 and the grinding wheel 101. The handle 62 is then raised further upwardly to draw the diamond dresser 61 across the face 120 of the grinding wheel 101 to produce the new grinding surface. It will be noted that this new grinding surface lies in a plane defined by the location of the point of the diamond dresser 61. Since the point of the dresser 61 has maintained its spatial relationship to the locking pawl 63 which returns to its same position when it is locked to the striker assembly 65, the newly dressed grinding wheel surface 120 is thereby automatically disposed through vertical main axis X—X and reference plane X. It will also be noted that the grinding surface 120 is also in its desired position relative to the lip 140 of the wheel guard 77.

I claim:

1. A method for sharpening a tool comprising:
   a. providing a grinding surface,
   b. supporting a rotary cutting tool which has a longitudinal axis and an apex at its forward end, the tool having at least two cutting edges with relieved trailing portions, said cutting edges extending radially outwardly from the apex in circumferentially spaced apart directions;
   c. causing automatic, timed, relative movement between the tool and the surface to grind said relieved cutting edges, said relative movement causing, in effect, the following synchronous movement of the tool relative to the surface:
      i. continuous rotation of the tool about a first axis which extends in generally the same direction as the tool axis, said first axis intersecting the tool axis at the apex of the tool, but being otherwise out of alignment with the tool axis during at least part of said rotation, and
      ii. simultaneous oscillation of the tool about a second axis which passes through said tool apex and is generally perpendicular to the first axis, said oscillation being in timed relation to said rotation.

2. The method of claim 1 wherein said oscillation tilts the tool toward the grinding surface each time the tool rotates one of said cutting edges past the grinding surface.

3. The method of claim 2 further comprising the step of withdrawing the tool away from the grinding surface each time the tool rotates past the relieved portion of one of the cutting edges.

4. The method of claim 3 further comprising the step of moving the forward end of the tool and the surface toward one another in selected increments.

5. A method for sharpening a tool comprising the steps of:
   providing a grinding surface,
   providing a cutting tool having an axis and at least one cutting edge with a relieved portion, moving said tool relative to said grinding surface to grind said cutting edge with said relieved portion, said movement including rotating said tool about an axis which extends in generally the same direction as the tool axis, said axis of rotation being at least partially out of alignment with said tool axis during at least a portion of said rotation, said movement also including tilting the tool about a second axis which extends generally normal to said axis of rotation.

6. The method of claim 5 wherein said cutting edge intersects said tool axis, and said second axis passes generally through said intersection.

7. The method of claim 5 for sharpening a tool having at least two cutting edges, further comprising the step of withdrawing the tool away from the grinding surface each time the tool rotates past one of the cutting edges.

8. The method of claim 7 wherein said rotation is continuous and said tilting is back and forth in timed relation to the rotational positions of the tool.

9. A method for sharpening a rotary cutting tool having a longitudinal axis, an apex at its forward end, and at least one cutting edge extending radially outwardly from said apex, said cutting edge having a relieved portion, said method comprising the steps of:
   providing a grinding surface,
   positioning the tool with its cutting edge at the grinding surface;
   moving the tool cutting edge a selected distance into the grinding surface; and
   effecting additional movement of the tool generally simultaneously about each of a pair of axes which both generally pass through the apex of the tool, one of said axes being in generally the same direction as the tool axis, both of said axes being at least partially out of alignment with said tool axis during at least a portion of said additional movement, to thereby grind the relieved portion of the cutting edge.

10. The method of claim 9 wherein said additional movement comprises rotation in one direction about one of said two axes and tilting about the other of said two axes in timed relation to the rotational positions of the tool.

11. The method of claim 10 for sharpening a tool having at least two cutting edges, further comprising the step of withdrawing the tool away from the grinding surface each time the tool rotates past one of the cutting edges.

12. The method of claim 11 wherein said rotation is continuous and said tilting is back and forth in timed relation to the rotational positions of the tool.

* * * * *

UNITED STATES PATENT AND TRADEMARK OFFICE
CERTIFICATE OF CORRECTION

PATENT NO. : 3,911,629
DATED : October 14, 1975
INVENTOR(S) : Steinmetz, John

It is certified that error appears in the above—identified patent and that said Letters Patent are hereby corrected as shown below:

In the Abstract:

Line 14 change "above" to --- about ---

Signed and Sealed this twenty-third Day of December 1975

[SEAL]

Attest:

RUTH C. MASON
*Attesting Officer*

C. MARSHALL DANN
*Commissioner of Patents and Trademarks*